3,069,367
COMPOSITION COMPRISING A FOAMABLE STYRENE POLYMER CONTAINING A THREE COMPONENT SYSTEM AND PROCESS OF FOAMING
Raymond D. Beaulieu, Speros P. Nemphos, and Daniel A. Popielski, Springfield, Mass., assignors to Monsanto Chemical Company, St. Louis, Mo., a corporation of Delaware
No Drawing. Filed Aug. 10, 1960, Ser. No. 48,550
13 Claims. (Cl. 260—2.5)

This invention relates to a novel foamable styrene polymer composition and to a process for manufacturing foamed structures therefrom.

Styrene polymer foams constitute a valuable class of materials which are finding an increasingly wide application in the fabrication of numerous industrial and consumer articles. The conventional method of extruding styrene polymer foams involves the use of a screw-type extruder. However, such foamed styrene polymers have a fairly large cell size, generally larger than 0.05 inch, and result in a product which is brittle and fragile. A foamed styrene polymer of fine uniform cell size would offer the advantage of flexibility with soft texture. It would further offer an economic value if such a product could be extruded with conventional equipment and conditions.

Therefore, it is an object of the invention to provide a new foamable styrene polymer composition.

Another object of this invention is to provide a process for producing a foamed styrene polymer having fine uniform cells whose average diameter is not greater than about 0.005 inch in diameter.

Other objects and advantages of this invention will become apparent from the following detailed description thereof.

It has been discovered that when minor amounts of a three-component additive system are brought into contact with a styrene polymer having incorporated therein or associated therewith a foaming agent, the resulting composition can be extruded by conventional techniques and with conventional extruding apparatus to prepare a foamed styrene polymer having a fine and uniform cell size. The three-component additive system is comprised of (a) an acid phosphate salt, (b) a neutral salt of an organic acid, and (c) a carbon dioxide liberating agent. The foamed product resulting from the process of extruding this new composition is flexible, has a soft texture, and consists of fine uniform cells whose average diameter is not greater than 0.005 inch.

The following examples are set forth to illustrate more clearly this invention and are not intended to limit the scope of this invention. Unless otherwise stated, all parts are parts by weight and the term "foamable styrene polymer" refers to a styrene polymer having incorporated therein or associated therewith a foaming agent.

*Example I*

One hundred parts of a foamable polystyrene having incorporated therein 7% by weight of n-pentane as a foaming agent, are homogeneously blended with 0.76 part of monobasic sodium phosphate ($NaH_2PO_4 \cdot H_2O$), 0.46 part of sodium bicarbonate ($NaHCO_3$) and 1.00 part of sodium citrate ($Na_3C_6H_5O_7 \cdot 2H_2O$). The resulting composition is extruded at 285–300° F. into a foamed sheet through a conventional single screw extruder and sheet die. The resulting foam sheet has a density of about 5 lbs. per cubic foot and is composed of fine uniform cells, the majority of which have a diameter of less than 0.005 inch. The foamed sheet is flexible and has a soft texture.

*Example II*

Example I is repeated with the exception that potassium sodium tartrate ($KNaC_4H_4O_6 \cdot 4H_2O$) is used in place of the sodium citrate employed therein. The results obtained are very similar to those of Example I.

*Example III*

Example I is repeated with the exception that monobasic calcium phosphate ($CaH_4(PO_4)_2 \cdot H_2O$) is used in place of the monobasic sodium phosphate employed therein. The results obtained are very similar to those of Example I.

*Example IV*

Example I is repeated except that 0.54 part of monobasic sodium phosphate, 0.33 part of sodium bicarbonate and 0.64 part of sodium citrate are homogeneously blended with the foamable polystyrene. The resulting foam sheet has about the same density as that in Example I and is composed of fine uniform cells, the majority of which have a diameter of less than 0.005 inch. Again the foam sheet is flexible and has a soft texture.

*Example V*

Example I is repeated except that 0.54 part of monobasic ammonium phosphate ($NH_4H_2PO_4$), 0.33 part of sodium bicarbonate and 0.64 part of sodium citrate are homogeneously blended with the foamable polystyrene. The results obtained are very similar to those of Example I with the majority of fine cells again being less than 0.005 inch in diameter.

*Example VI*

Example I is repeated except that 0.21 part of monobasic sodium phosphate, 0.19 part of sodium bicarbonate and 0.50 part of sodium citrate are homogeneously blended with the foamable polystyrene. The resulting foam sheet has about the same density as in Example I and is composed of fine uniform cells, the majority of which have a diameter of less than 0.005 inch. The foam sheet is flexible and has a soft texture.

*Example VII*

Example I is repeated except that the monobasic sodium phosphate is purposely omitted therefrom. The resulting foam sheet has a density of about 5 lbs. per cubic foot, but has a substantially larger cell size than that shown in Examples I–VI. The average cell diameter is in excess of 0.01 inch. The foam sheet has substantially less flexibility and the cell size is more heterogeneous.

*Example VIII*

Example I is repeated except that the sodium citrate is purposely omitted therefrom. The resulting foam sheet was composed of substantially larger cell size than that shown in Examples I–VI with the average cell size being in excess of 0.01 inch in diameter. The foam sheet has substantially less flexibility than that shown in Examples I–VI.

*Example IX*

Example I is repeated except that the sodium bicarbonate is purposely omitted therefrom. The resulting foam sheet has substantially larger cell size than that shown in Examples I–VI with the average cell size being in excess of 0.01 inch in diameter. The foam sheet has less flexibility and the cell size is more heterogeneous.

It has been found that the range of component parts of this composition can be varied without substantially changing the results shown in the examples. However, the economical and practical range of the components are (a) 92–95 parts by weight of a styrene polymer, (b) 8–5 parts by weight of a foaming agent, (c) a minor wherein the neutral salt of an organic acid is potassium sodium tartrate.

6. A composition of matter as described in claim 1 wherein the carbon dioxide liberating agent is sodium bicarbonate.

7. A composition of matter as described in claim 1 wherein the acid phosphate salt is monobasic sodium phosphate; the neutral salt of an organic acid is sodium citrate; and the carbon dioxide liberating agent is sodium bicarbonate.

8. A process for preparing a foamed styrene polymer having a fine uniform cell size in which the average cell diameter is not greater than about 0.005 inch, which comprises extruding a foamable styrene polymer composition at a temperature ranging from 250° F. to about 400° F., and under a pressure within the die ranging from 150 p.s.i. to about 3,200 p.s.i.; said foamable styrene polymer composition comprising (a) 92–95 parts by weight of a styrene polymer, (b) 8–5 parts by weight of a foaming agent, and (c) a minor amount of a three-component additive system sufficient to cause fine cell size when the composition is extruded; said styrene polymer being selected from the group consisting of styrene homopolymers and styrene interpolymers wherein the styrene interpolymers contain a predominant proportion by weight of styrene with the balance of said interpolymer being selected from those organic monomeric compounds which will interpolymerize with styrene monomer; said foaming agent being a volatile non-reactive organic compound which has, at most, a slight solvent action on the styrene polymer and which has a boiling temperature between about 10° C. and the softening point of the styrene polymer; said three-component additive system comprising (1) an acid phosphate salt selected from the group consisting of alkali metal, alkaline earth metal and ammonium polyacid phosphates, (2) a neutral salt of an organic acid selected from the group consisting of alkali metal and alkaline earth metal salts of mono and polycarboxylic acids, and (3) a carbon dioxide liberating agent selected from the group consisting of alkali metal, alkaline earth metal, and ammonium bicarbonates and carbonates; said components being present in the ratio of (1) 0.20–0.80 part by weight of the acid phosphate salt, (2) 0.50–1.00 part by weight of the neutral salt of an organic acid, and (3) 0.20–0.60 part by weight of the carbon dioxide liberating agent.

9. A process as described in claim 8 wherein the acid phosphate salt is monobasic sodium phosphate.

10. A process as described in claim 8 wherein the acid phosphate salt is monobasic calcium phosphate.

11. A process as described in claim 8 wherein the neutral salt of an organic acid is sodium citrate.

12. A process as described in claim 8 wherein the neutral salt of an organic acid is potassium sodium tartrate.

13. A process as described in claim 8 wherein the carbon dioxide liberating agent is sodium bicarbonate.

References Cited in the file of this patent

UNITED STATES PATENTS

| | | |
|---|---|---|
| 2,911,382 | Barkhuff | Nov. 3, 1959 |
| 2,941,965 | Ingram | June 21, 1960 |

United States Patent Office 3,069,370
Patented Dec. 18, 1962

3,069,370
COACERVATION PROCESS FOR ENCAPSULATION OF LIPOPHILIC MATERIALS
Erik H. Jensen, Kalamazoo Township, Kalamazoo County, and John G. Wagner, Kalamazoo, Mich., assignors to The Upjohn Company, Kalamazoo, Mich., a corporation of Delaware
No Drawing. Filed Dec. 22, 1958, Ser. No. 785,104
26 Claims. (Cl. 260—23)

This invention relates to a novel article of manufacture more particularly to encapsulated, finely divided lipophilic material and to a process for the production thereof.

According to this invention, encapsulated, finely divided lipophilic material whose mantle comprises a polymer is prepared by a process which includes the steps of (1) preparing a dispersion of lipophilic material in an aqueous liquid solution of a polymer as defined hereinafter, (2) inducing liquid-liquid phase separation of the polymer by the addition of an insolubilizing salt, thereby inducing the polymer to encapsulate the dispersed lipophilic material, (3) adjusting the pH of the mixture so as to reduce the solubility of the mantle of the encapsulated material in the aqueous liquid, and (4) separating the thus-produced capsules from the aqueous liquid.

The novel encapsulated product of this invention is valuable as an article of manufacture in widely diversified fields. It is useful wherever lipophilic liquid, with or without other ingredients contained therein, is more readily handled temporarily as a solid or wherever the properties of a lipophilic solid are enhanced by the protective mantle of a polymer as herein defined. For example, the instant product can be employed in the printing art in the same manner as the coacervates described in U.S. 2,800,457 and 2,800,458 where a pressure-sensitive, reproducing film, e.g., on paper, plastic, cloth or wood, or a dry ink or dye, is desired which is non-staining in ordinary handling. It may be used as a storage form of readily oxidizable or light sensitive lipophilic material or to maintain otherwise incompatible mixtures, the encapsulated material being freed when needed by crushing, milling or by reversing the encapsulating process. The encapsulated product finds use in the even dispersing of lipophilic material onto films or sheets, the dry encapsulated material providing an excellent medium for handling otherwise sticky, oily, greasy, staining or unstable lipophilic material. In the lipophilic encapsulated material can be incorporated magnetic or magnetizable particles, e.g., to be used in the "memory" or information storage devices well known in the computer, indexing, television and tape recording arts. Alternatively, materials which are predictably altered by light, high frequency radiation, electronic bombardment or an electrical or magnetic field may be incorporated for use, for example, in the photographic and recording arts. The encapsulated product of this invention finds use in the soap art, where a fatted soap is desired or one containing an otherwise unstable antiseptic or antibiotic, the encapsulated product being produced with a fragile mantle that breaks on manipulation; in the fertilizer, plant hormone, insecticide, antifungal, antibacterial and antiparasiticidal arts, where a slow-release product is desired or one that is not immediately washed away by precipitation; in the adhesive field, e.g., for pressure sensitive tapes and labels or anticreeping adhesives; in the catalyst art where it is desirable to store the catalyzable material with the catalyst until the desired reaction is to take place, e.g., by removing the polymer mantle by breaking or heating or by chemical means, e.g., by adding a solvent for the polymer, or otherwise reversing the encapsulating process.

The product of this invention can be used for human consumption by employing a nontoxic, i.e., in the amount consumed, polymer and lipophilic material. Thus oily products, e.g., vitamins or edible vegetable, mineral or animal fats and oils, can be consumed per se in a dry state, maintained in a more stable state and/or incorporated in products where these edible oils or vitamins would otherwise produce an objectionable taste, texture or color or would be unstable. For example, vitamins or fats can thus be incorporated in dry cereals, margarine, ice creams, butter, milk or other dairy products, in fruits, vegetables and their juices, e.g., frozen orange juice, bread and other baked goods, jams and other condiments, or for maintaining unstable flavorings, the mantle being broken in cooking or mixing.

The encapsulated lipophilic material can have medicaments contained therein, vitamins or other diet supplements making the encapsulated product of this invention very useful in the pharmaceutical field. Thus products having sustained action can be produced; oral products can be prepared in which gastric irritation and/or drug destruction in the stomach is reduced; objectionable taste and/or odor can be reduced or eliminated; liquid preparations can be converted to dry products, stability of pharmaceuticals can be increased by preventing oxidative, hydrolytic or photolytic degradation of the drugs; more versatile formulation thereof can be achieved by separating incompatibles or producing stable emulsions, etc.; absorption characteristics of the active ingredient can be improved; preparations can be formulated in which one or more ingredient is encapsulated and thus protected until used and then liberated by rubbing or otherwise physically rupturing the mantle, e.g., in lotions, creams, ointments, chewable tablets or gum.

There are alternative methods available in the art which can accomplish by other means some of the results described above. A related process is one involving a coacervation as claimed in U.S. Patents 2,800,457 and 2,800,458. The processes claimed therein involve the use of a gelable hydrophilic colloid material, e.g., gelatin and agar-agar, by making an aqueous sol of that material, precipitating the colloid and thereafter cooling the resultant mixture below the gel point so as to produce a stable encapsulated product. It will be apparent from the description of this invention that the instantly claimed process does not involve that claimed coacervation process and that the encapsulated product of the instant process is of an entirely different nature than the gelable colloid coated products claimed in those patents.

DEFINITIONS

When employed to describe the instantly claimed processes, the following terms are defined as follows:

"Finely divided" means consisting essentially of small particles, e.g., a particle size of less than 2 mm. and preferably from about 0.5 to 200 microns;

"Mantle" means the film-like coating of polymer which envelops the lipophilic material;

"Aqueous" means comprising significant, e.g., 10–100%, water;

"Solution" means a true solution or a colloidal sol;

"Dispersion" means evenly distributed, either as an emulsion or a suspension of solids, e.g., so that the particle size is less than 2 mm., e.g., from about 0.5 to about 200 microns;

"Lipophilic" means having a relatively strong attraction for low dielectric constant, relatively non-polar media, e.g., fat or oil like in character and substantially insoluble in the aqueous mixture employed.

"Insolubilizing salt" means a salt, inorganic or organic, per se or as a solution, which precipitates as a liquid the polymer employed in the process of this invention;

"Linear macromolecular, synthetic polymer" means a